US012633186B2

(12) United States Patent
Van Wiemeersch et al.

(10) Patent No.: US 12,633,186 B2
(45) Date of Patent: *May 19, 2026

(54) SYSTEMS AND METHODS OF INTERIOR SENSOR-BASED VEHICLE ACTION ACTUATION

(71) Applicant: Ford Global Technologies, LLC, Dearborn, MI (US)

(72) Inventors: John Robert Van Wiemeersch, Novi, MI (US); Jun Lin, Westland, MI (US); Jialiang Le, Canton, MI (US); Saeed David Barbat, Novi, MI (US)

( * ) Notice: Subject to any disclaimer, the term of this patent is extended or adjusted under 35 U.S.C. 154(b) by 285 days.

This patent is subject to a terminal disclaimer.

(21) Appl. No.: 18/325,520

(22) Filed: May 30, 2023

(65) Prior Publication Data
US 2023/0306806 A1 Sep. 28, 2023

Related U.S. Application Data

(63) Continuation-in-part of application No. 17/240,401, filed on Apr. 26, 2021, now Pat. No. 11,725,451.

(51) Int. Cl.
| | |
|---|---|
| *G06F 3/00* | (2006.01) |
| *G01S 13/89* | (2006.01) |
| *G06F 3/01* | (2006.01) |
| *G07C 9/28* | (2020.01) |

(52) U.S. Cl.
CPC ................ *G07C 9/28* (2020.01); *G01S 13/89* (2013.01); *G06F 3/017* (2013.01)

(58) Field of Classification Search
CPC ......... E05F 15/627; E05F 15/76; E05F 15/41;

E05F 1/1091; E05F 15/646; E05F 15/70; E05F 2015/767; E05Y 2201/462; E05Y 2400/554; E05Y 2400/58; E05Y 2900/531; E05Y 2400/36; E05Y 2201/416; E05Y 2201/216; E05Y 2800/113; E05Y 2900/546; E05Y 2400/854; E05Y 2900/548; E05Y 2400/32; E05Y 2400/445; E05Y 2400/44; E05Y 2800/00; B60J 5/06; H02H 7/0851

See application file for complete search history.

(56) References Cited

U.S. PATENT DOCUMENTS

| | | | | |
|---|---|---|---|---|
| 11,725,451 B2* | 8/2023 | Lin | .......................... | E05F 15/73 49/31 |
| 12,215,531 B1* | 2/2025 | Cheringal | .............. | B60J 5/0413 |
| 2004/0119823 A1* | 6/2004 | Takagi | ................... | H04N 7/181 348/E7.086 |
| 2007/0294001 A1* | 12/2007 | Underdal | ................. | G06N 7/01 701/31.4 |

(Continued)

*Primary Examiner* — Chi Q Nguyen

(74) *Attorney, Agent, or Firm* — Frank Lollo; Eversheds Sutherland (US) LLP

(57) ABSTRACT

Systems and methods of performing a vehicle action based on an interior radar sensor that may be used to detect a user outside of the vehicle are provided. The interior radar sensor may be installed behind the center line of a headliner of the vehicle, and detect the user's head and/or an upper-body gesture through any window of the vehicle, e.g., upon detection of a key fob carried by the user outside the vehicle. Upon detection of a valid gesture, e.g., a predetermined pattern of movement, by the user, the vehicle action may be performed.

19 Claims, 4 Drawing Sheets

(56)        References Cited

U.S. PATENT DOCUMENTS

| | | | |
|---|---|---|---|
| 2010/0242363 A1* | 9/2010 | Hirota | H02H 7/0851 |
| | | | 318/473 |
| 2020/0208460 A1* | 7/2020 | Ma | E05F 15/689 |
| 2020/0386035 A1* | 12/2020 | Battlogg | B60Q 1/324 |
| 2022/0290481 A1* | 9/2022 | Kromer | E05F 15/627 |
| 2023/0235609 A1* | 7/2023 | Nguyen | B60R 16/0215 |
| | | | 49/26 |
| 2023/0243199 A1* | 8/2023 | Semineth | E05F 15/611 |
| | | | 49/28 |
| 2023/0306806 A1* | 9/2023 | Van Wiemeersch | G01S 13/56 |
| 2024/0328230 A1* | 10/2024 | Osmialowski | E05F 1/10 |
| 2025/0043614 A1* | 2/2025 | Mikiczenko | E05F 15/40 |

* cited by examiner

200

Vehicle Control System

Processor(s) — 202

Communication System — 204

Memory — 206

Vehicle Status Determination Module — 208

Key Fob Detection Module — 210

Radar Sensors Interface Module — 212

Window Location Module — 214

Subject Determination Module — 216

Predetermined Movement Determination Module — 218

Vehicle Action Interface Module — 220

Operating System — 222

SYSTEMS AND METHODS OF INTERIOR SENSOR-BASED VEHICLE ACTION ACTUATION

CROSS-REFERENCE TO RELATED APPLICATIONS

This application claims priority to, the benefit of, and is a continuation-in-part of U.S. application Ser. No. 17/240, 401, filed Apr. 26, 2021, which is hereby incorporated by referenced herein in its entirety.

BACKGROUND

There are many ways to perform vehicle actions, such as hands-free liftgate opening or using a key fob to unlock or remote start the vehicle. Current methods require additional proximate sensors underneath the rear bumper area outside of the vehicle or additional buttons on the key fob. Accordingly, a user with the vehicle key fob must kick in this area to open the tailgate or press a button on the key fob to remote start the vehicle. However, it may sometimes be difficult for a user holding a lot of stuff to kick in this area or press a button on the key fob. Second, this method requires additional proximate sensors which serves this application only. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
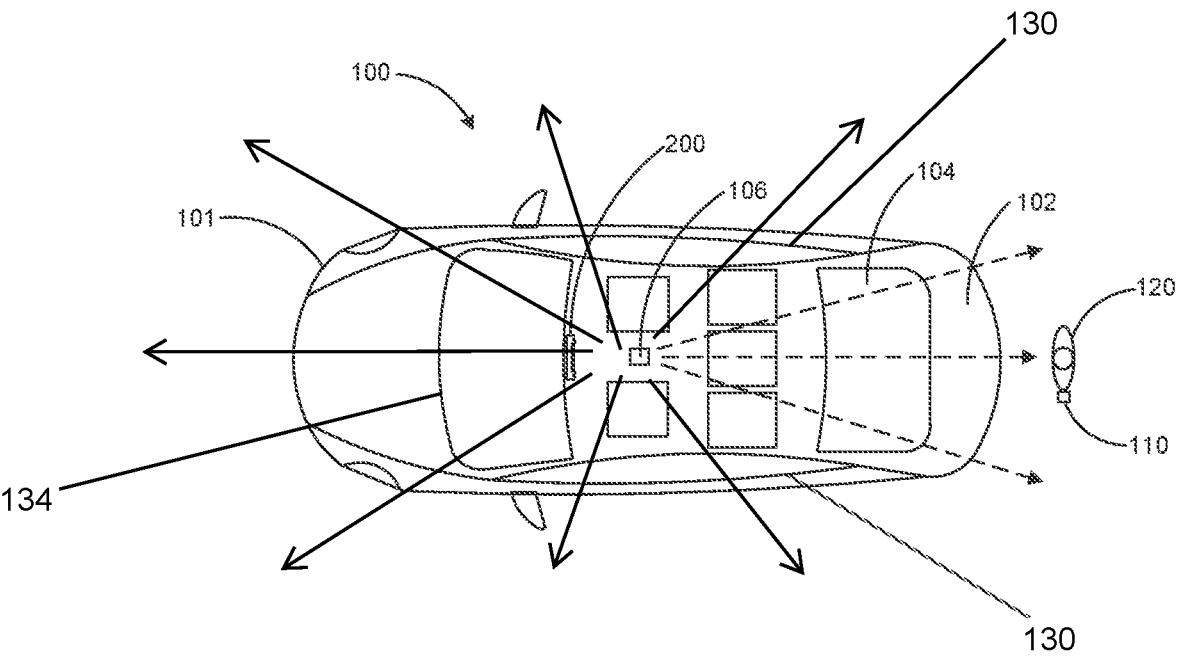
FIG. 1 illustrates a top-down view of an interior sensor-based vehicle action actuation system in accordance with the principles of the present disclosure.

Disclosed are systems and methods of performing a vehicle action based on an interior sensor (e.g., a radar sensor or the like) that may be used to detect a user outside of the vehicle, e.g., the user's head and/or an upper-body gesture. The interior sensor may be installed in front of or behind the center line of a headliner of the vehicle, and may cover not only the whole in-cabin area, but also the nearby area of the vehicle. For example, the interior sensor may be used to detect the user through the rear window, side window, or windshield of the vehicle.

In some instances, there are six pre-conditions that may be satisfied in order to perform a vehicle action using the interior radar sensor. First, the vehicle is parked. Second, the system may detect a user device such as a key fob (or other device, such as a phone as a key (PaaK) or the like) near the vehicle. Whenever the user device is detected near the vehicle, the sensor will wake up. Other methods may be used to wake up the sensor including, but not limited to, an exterior OEM keypad, and aftermarket RF keypad, FordPass Remote Application, NFC cards, the insertion of the key into a key blade cylinder, or biometric scanners such as finger print and facial recognition. Third, the sensor may find the window or windshield location in 3D space. Fourth, a check may be performed to determine if a user is outside of the window or windshield. Fifth, it may be determined whether the subject is a human (head/upper-body) on the other side of the windshield. Finally, a check may be performed to identify the motion and head/upper-body gesture to initiate the vehicle action. For example, the user may swing his/her head or upper-body from left to right and right to left. Moreover, the sensor can be turned off if it is not used by other features and the user device is far away from the vehicle. Such operations described herein should always be implemented and/or performed in accordance with the owner manual and safety guidelines.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 4:
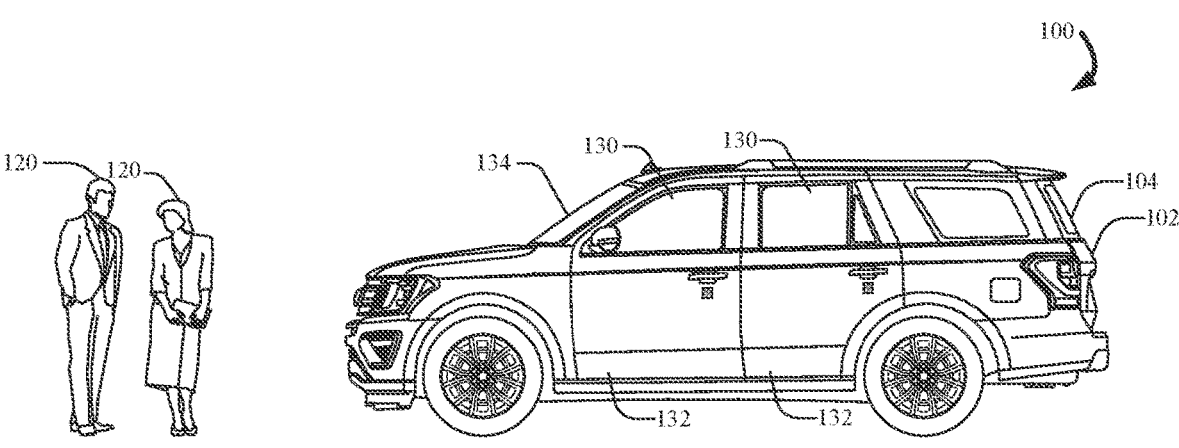
FIG. 4 illustrates a side view of an interior sensor-based vehicle action actuation system in accordance with the principles of the present disclosure.

Referring now to FIG. 1 and FIG. 4, system 100 for interior sensor-based vehicle action actuation is provided. System 100 may include vehicle 101 having liftgate 102, e.g., at the rear of vehicle 101, rear window 104, side windows 130, windshield 134, doors 132, one or more sensors 106, and vehicle control system 200. Rear window 104 may be part of liftgate 102, or alternatively, rear window 104 and liftgate 102 may be separate components of vehicle 101. As referred to herein, it should be understood that the term liftgate referenced throughout this specification may also refer to a tailgate, trunk, front trunk (frunk), hood or decklid, moon/sun roof/shade, or vista roof/shade. In addition, system 100 may include a user device, e.g., key fob 110, which may be portable and carried by user 120, e.g., the driver. Other portable devices may be used as well, including phones (e.g., Phone as a Key (PaaK)), wearables, etc. In some instances, key fob 110 may be integrated with the key associated with vehicle 101. Control system 200 may detect when key fob 110 is within a predetermined distance from vehicle 101 using a key fob (or other device) sensor system integrated with vehicle 101, as described in further detail below.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

Sensors 106 may be 3D imaging sensors, e.g., radar sensors or millimeter wave radar sensors, which may detect motion within a predetermined range of vehicle 101. For example, sensors 106 may detect a subject, e.g., user 120, standing adjacent to the exterior of the rear, side, or front of vehicle 101, as well as movements conducted by user 120, e.g., head moving left to right and right to left, arms being raised or lowered, torsos moving away from or toward the vehicle, etc. Accordingly, sensors 106 may generate data indicative of the subject, which may be used to identify whether the subject is a human, as well as the motions performed by the subject, which may be used to detect whether a predetermined pattern of motions has been performed.

Sensors 106 may be positioned and angled within the interior cabin of vehicle 101 such that sensors 106 have a field of view between 1 and 360 degrees. For example, sensors 108 may be mounted behind the centerline of the headliner of vehicle 101. Sensors 108 may also be mounted in front of the centerline of the headliner of the vehicle 101. Sensors 108 may be positioned in other locations within the interior of vehicle 101, which provide a view of subjects through rear window 104, side windows 130, and/or windshield 134. As will be understood by a person having ordinary skill in the art, sensors 106 may have a narrower field of view, e.g., such that user 120 is only detectable via sensors 106 when user 120 is viewable through window 104. Moreover, sensors 106 may detect rear window 104, side windows 130, and/or windshield 134 of vehicle 101 and generate data indicative of rear window 104, side windows 130, and/or windshield 134, which may be used to locate rear window 104, side windows 130, and/or windshield 134 in 3D space relative to vehicle 101. Accordingly, user 120 may be detected through rear window 104, side windows 130, and/or windshield 134 by sensors 106.

Sensors 106 may be utilized for multiple functions, in addition to those ascribed to them herein. For example, sensors 106 also may be used to detect the presence of one or more occupants, e.g., children, within vehicle 101, and generate data indicative of the presence of the one or more occupants, which may be used to alert the driver of vehicle 101 that there are other occupants in the vehicle, e.g., via a visual or audio alert system of vehicle 101. Moreover, sensors 106 may automatically turn off, or enter a "sleep mode," if they are not being utilized to detect subjects adjacent to the exterior of vehicle 101 or for other functions such as detecting the presence of occupants within vehicle 101. For example, if key fob 110 is not detected to be within a predetermined distance from vehicle 101 for more than a predetermined amount of time, sensors 106 may turn off or enter sleep mode. In another example, if key fob 110 is detected to be within the predetermined distance without any indication a vehicle action should be performed for more than a threshold amount of time, sensors 106 may turn off or enter sleep mode.

Figure 2:
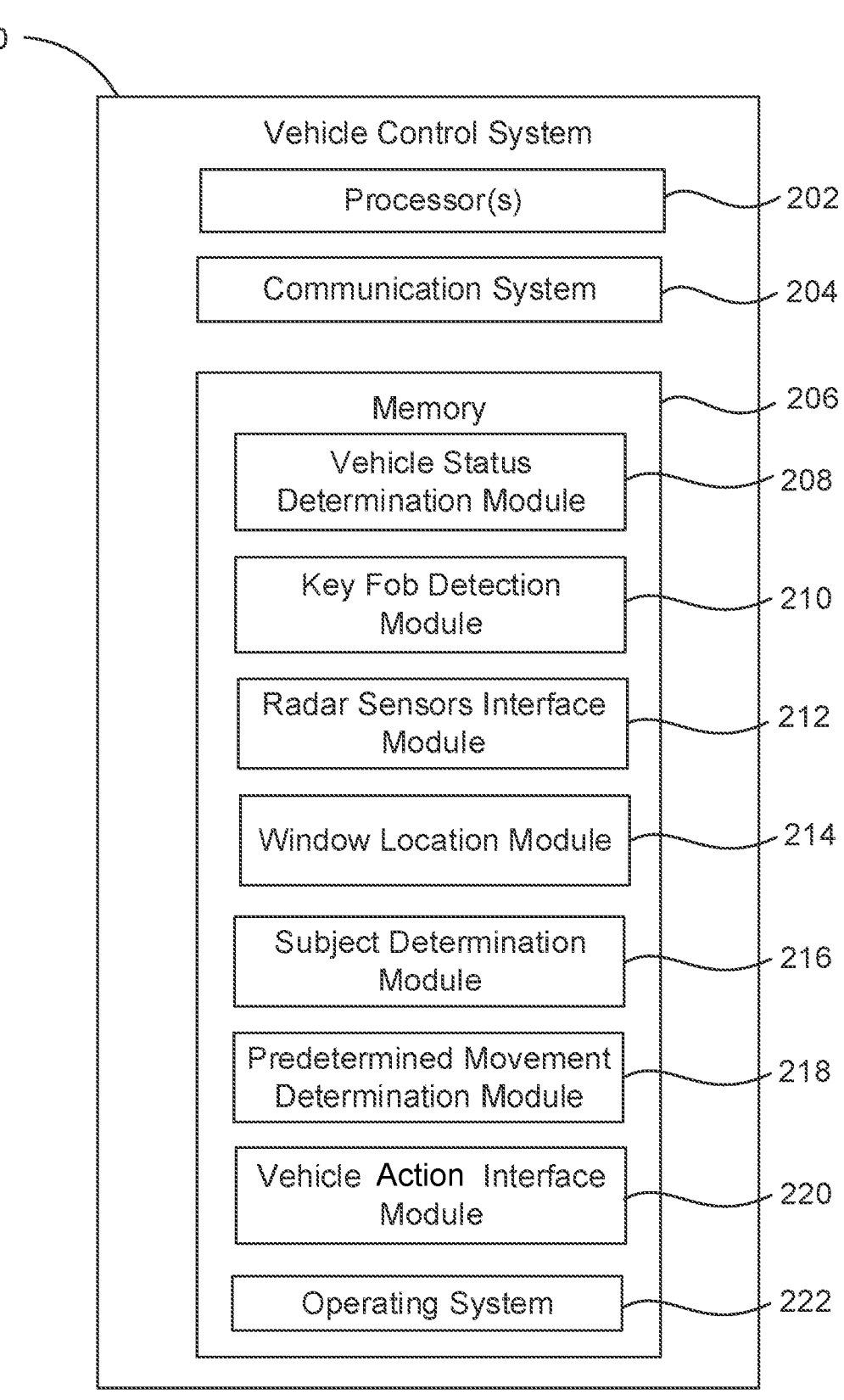
FIG. 2 illustrates example components that may be included in an exemplary vehicle control system in accordance with the principles of the present disclosure.

Referring now to FIG. 2, components that may be included in vehicle control system 200 are described in further detail. Control system 200 may include one or more processors 202, communication system 204, and memory 206. Communication system 204 may include a wireless transceiver that allows control system 200 to communicate with the electrical components of vehicle 101, liftgate 102, side windows 130, driver and passenger doors 132, the vehicle's engine, sensors 106, and key fob 110. The wireless transceiver may use any of various communication formats, such as, for example, an Internet communications format, or a cellular communications format.

Memory 206, which is one example of a non-transitory computer-readable medium, may be used to store operating system (OS) 222, vehicle status determination module 208, key fob detection module 210, radar sensors interface module 212, window location module 214, subject determination module 216, predetermined movement determination module 218, and vehicle action interface module 220. The modules are provided in the form of computer-executable instructions that may be executed by processor 202 for performing various operations in accordance with the disclosure.

Vehicle status determination module 208 may be executed by processor 202 for receiving information about the status of vehicle 101 from the electrical components of vehicle 101, and determining the status of vehicle 101 based on the information, e.g., whether vehicle 101 is parked.

Key fob detection module 210 may be executed by processor 202 for receiving information from the key fob sensor system of vehicle 101 to detect if key fob 110 is within a predetermine distance from vehicle 101. For example, key fob detection module 210 may detect if key fob 110 is within five or ten feet from vehicle 101.

Radar sensors interface module 212 may be executed by processor 202 for instructing sensors 106 to wake up if sensors 106 are in a sleep mode, and if key fob 110 is detected by key fob detection module 210, such that sensors 106 may detect the presence of a subject outside vehicle 101, e.g., though side windows 130, as well as motions performed by the subject. Accordingly, radar sensors interface module 212 may receive data generated by sensors 106 indicative of the presence of the subject as well as the motions performed by the subject, to determine that the subject is adjacent to the exterior of the vehicle 101. In addition, radar sensors interface module 212 may receive data generated by sensors 106 indicative of the locations of rear window 104, side windows 130, and/or windshield 134 relative to vehicle 101. Moreover, radar sensors interface module 212 further may receive data generated by sensors 106 indicative of, e.g., the presence of one or more occupants within the interior of the cabin of vehicle 101, to determine the one or more occupants are within vehicle 101, as described above.

Window location module 214 may be executed by processor 202 for locating window 104, side windows 130, and/or windshield 134 relative to vehicle 101 based on the data received by radar sensors interface module 212. For example, window location module 214 may locate window 104 in 3D space and determine the dimensions of window 104, such that radar sensors interface module 212 only processes data received from sensors 106 indicative of the presence of the subject through window 104. The same can be done for side windows 130 and windshield 134.

Subject determination module 216 may be executed by processor 202 for determining whether the subject is a human subject, such that radar sensors interface module 212 only processes data received from sensors 106 indicative of the motions performed by the subject if the subject is determined to be a human, e.g., user 120. Accordingly, subject determination module 216 may ignore a subject if it is determined not to be a human, e.g., a stationary object or an animal.

Predetermined movement determination module 218 may be executed by processor 202 for detecting motions performed by user 120 from the data received by radar sensors interface module 212, and determining whether the detected motions correspond with predetermined motions stored within memory 206. For example, predetermined motions may include user 120 moving their head right to left and left to right, and/or up to down and down to up. Other predetermined motions may include, but are not limited to, the user pointing, nodding, or otherwise gesturing toward a particular door or window; the user turning their torso 90, 180, 360, or any other number of degrees; the user walking lateral to the vehicle or toward or away from the vehicle; the user raising either their left and/or right arm to a particular height or angle or raising their arms in front of them or laterally to their side; the user making a particular motion with their hands or arms such as making a lateral sweeping motion in front of their torso or moving their arms in circles; or any combination of motions. Predetermined movement determination module 218 may then be configured to differentiate between various predetermined motions or combinations thereof.

Vehicle action interface module 220 may be executed by processor 202 for instructing vehicle 101 to cause the vehicle to automatically perform the vehicle action if the predetermined motion is detected by predetermined movement determination module 218. Accordingly, vehicle action interface module 220 may receive information from the electrical components of vehicle 101 indicative of the status of liftgate 104, doors 132, side windows 130, the vehicle engine, or the climate controls, e.g., whether liftgate 104 is in its closed or open configuration or whether doors 132 are in the locked or unlocked configuration. Possible vehicle actions controlled by vehicle action interface module 220 include, but are not limited to, starting the vehicle engine, opening or closing liftgate 104, opening or closing any or all side windows 130, locking or unlocking any or all doors 132, opening or closing any or all doors 132, or activating the vehicle's climate controls. One skilled in the art would understand that this list is non-exhaustive, and that vehicle action interface module 220 may be configured to control any number of vehicle actions.

Further, each vehicle action controlled by vehicle action interface module 220 may be activated by a particular predetermined motion detected by predetermined movement determination module 218. For example, arms being moved in a clockwise circle motion may cause side windows 130 to roll up/close while a counter-clockwise motion may cause them to roll down/open, or a user laterally sweeping their right arm in front of their torso may cause doors 132 to unlock or open while laterally sweeping their left arm in front of their torso may cause doors 132 to lock or close. A further example includes remote starting the vehicle's engine and/or climate controls when the user walks toward the driver door of the vehicle or shutting the engine down when a user turns their torso 180 degrees and walks away from the vehicle. In yet another example, the user could make any of the aforementioned arm motions while also pointing at, walking toward, or otherwise gesturing to a particular door or window so that the vehicle only performs the vehicle action for the particular door or window. In an alternate example, the vehicle action interface module may open/close or lock/unlock a door or window or a pair of doors or windows the user is closest to in place of having the user gesture to a particular door or window. One skilled in the art would understand that numerous predetermined motions and combinations of predetermined motions, each activating their own vehicle action, not discussed herein are still possible. Each vehicle action may be assigned its own predetermined motion or combination of predetermined motions that causes the vehicle action to be activated.

Figure 3:
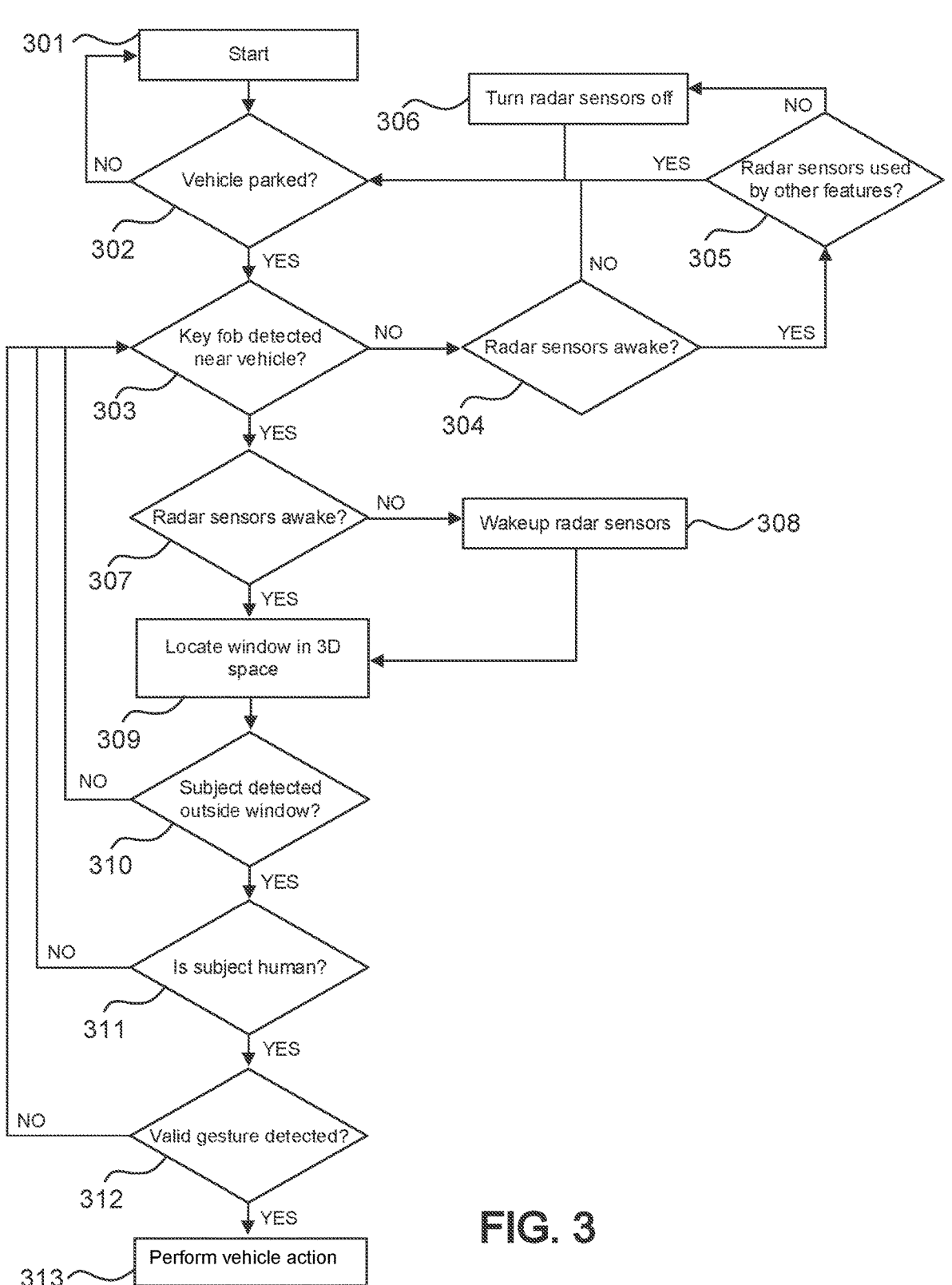
FIG. 3 is a flow chart illustrating exemplary steps for actuating a vehicle action in accordance with the principles of the present disclosure.

Referring now to FIG. 3, exemplary method 300 for performing a vehicle action of vehicle 101 is provided. Method 300 starts at step 301. At step 302, control system 200 determines whether vehicle 101 is parked based on information received by vehicle status determination module 208. If vehicle 101 is not parked, the method starts again at step 301. If vehicle 101 is parked, at step 303, control system 200 determines whether key fob 110 is detected within a predetermined distance from vehicle 101 based on information received from key fob detection module 210. If key fob 110 is not detected within the predetermined distance from vehicle 101, at step 304, control system 200 determines whether sensors 106 are awake based on information received by radar sensors interface module 212. If sensors 106 are not awake, method 300 returns to step 302. If sensors 106 are awake, at step 305, control system 200 determines whether sensors 106 are being utilized by other features, e.g., detecting the presence of occupants within the interior cabin of vehicle 101. If sensors 106 are being used by other features of vehicle 101, then method 300 returns to step 302. If sensors 106 are not being used by other features, at step 306, sensors 106 may be turned off or enter sleep mode, and then return to step 302.

If key fob 110 is detected within the predetermined distance from vehicle 101, at step 307, control system 200 determines whether sensors 106 are awake based on information received by radar sensors interface module 212. If sensors 106 are awake, at step 309, control system 200 locates window 104 of vehicle 101, and its dimensions, in 3D space via window location module 214. If sensors 106 are not awake at step 307, at step 308, sensors 106 are awakened via radar sensors interface module 212, and proceeds to step 309 to locate window 104. Next, at step 310, control system 200 determines whether a subject is detected adjacent to the exterior of vehicle 101 through window 104, side windows 130, or windshield 134 based on information received from radar sensors interface module 212. If no subjects are detected, method 300 returns to step 303 to determine whether key fob 110 is detected within the predetermined distance from vehicle 101.

If a subject is detected through window 104, side windows 130, or windshield 134, at step 311, control system 200 determined whether the subject is human via subject determination module 216. If the subject is not determined to be a human, method 300 returns to step 303. If the subject is determined to be a human, e.g., user 120, at step 312, control system 200 determines whether the motion performed by the subject is a valid gesture, e.g., corresponds with a predetermined motion stored in memory 206 of control system 200, via predetermined movement determination module 218. For example, whether the subject is moving their head in a predetermined pattern, e.g., left to right and right to left. If a valid gesture is not detected, method 300 returns to step 303. If a valid gesture is detected, at step 313, control system 200 instructs the vehicle to perform one or more of the aforementioned vehicle actions, such as causing liftgate 104 to open, via vehicle action interface module 220.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for interior sensor-based vehicle action activation, the system comprising:
    a vehicle comprising an interior cabin;
    one or more sensors disposed within the interior cabin of the vehicle, the one or more sensors configured to detect motion exterior to the vehicle and generate data indicative of the detected motion;
    a memory that stores computer-executable instructions; and
    a processor configured to access the memory and execute the computer-executable instructions to:
    receive the data indicative of the detected motion from the one or more sensors;
    determine a predetermined motion based on the data indicative of the detected motion; and
    cause, based on the detection of the predetermined motion, the vehicle to automatically perform a vehicle action.

2. The system of claim 1, wherein the one or more sensors comprise 3D imaging radar.

3. The system of claim 1, wherein the vehicle action comprises one or more of starting a vehicle engine, opening or closing a liftgate of the vehicle, opening or closing one or more windows of the vehicle, locking or unlocking one or more doors of the vehicle, opening or closing the one or more doors, opening or closing a moon roof or a sun roof, or activating climate controls of the vehicle.

4. The system of claim 3, wherein the predetermined motion comprises a plurality of predetermined motions, wherein at least one predetermined motion of the plurality of predetermined motions indicates a specific door of the vehicle, and wherein the processor is further configured to open or close the specific door based on detecting the at least one predetermined motion.

5. The system of claim 3, wherein the processor is further configured to determine a detected side of the vehicle the predetermined motion is detected, and wherein the vehicle action comprises unlocking at least one door of the one or more doors of the vehicle, the at least one door being located on the detected side.

6. The system of claim 1, further comprising:
    a user device configured to be carried by a user outside the vehicle; and
    a user device sensor operatively coupled to the vehicle and configured to detect the user device when the user device is within a predetermined distance from the vehicle,
    wherein the one or more sensors are configured to detect motion exterior of the vehicle based on the user device being detected by the user device sensor.

7. The system of claim 6, wherein the one or more sensors are configured to:
    determine that the user device is not detected within the predetermined distance from the vehicle or if the user device is detected within the predetermined range for more than a threshold amount of time; and
    transition to an off state based on the determination that the user device is not detected within the predetermined distance from the vehicle or the user device is detected within the predetermined range for more than a threshold amount of time.

8. The system of claim 1, wherein the one or more sensors are further configured to detect one or more windows of the vehicle and generate data indicative of the detected one or more windows, and wherein the processor is further configured to locate the one or more windows in 3D space based on the data indicative of the detected rear window.

9. The system of claim 8, wherein the one or more sensors are configured to detect the motion exterior to the vehicle through the located one or more windows.

10. The system of claim 1, wherein the processor is further configured to identify that the motion detected exterior to the vehicle is by a human based on the data indicative of the detected motion, and wherein the processor is configured to determine the predetermined motion based on identifying that the motion detected exterior to the vehicle is by the human.

11. The system of claim 1, wherein the one or more sensors are further configured to detect one or more occupants within the interior cabin of the vehicle.

12. A system for interior sensor-based vehicle action activation, the system comprising:
    a vehicle comprising an interior cabin;
    one or more sensors disposed within the interior cabin of the vehicle, the one or more sensors configured to detect motion exterior to the vehicle and to detect one or more occupants within the interior cabin of the vehicle;
    a memory that stores computer-executable instructions; and
    a processor configured to access the memory and execute the computer-executable instructions to:
    detect, based on the motion detected by the one or more sensors, a first predetermined gesture in a direction of a component of the vehicle; and
    cause, based on the detection of the first predetermined gesture, the vehicle to automatically perform a first vehicle action to control the component of the vehicle.

13. The system of claim 12, further comprising:
    a user device configured to be carried by a user outside the vehicle; and a user device sensor operatively coupled to the vehicle and configured to detect the user device based on the user device being within a predetermined distance from the vehicle, wherein the one or more sensors are configured to detect motion exterior of the rear of the vehicle only if the user device is detected by the user device sensor.

14. The system of claim 12, wherein the processor is further configured to determine that the vehicle is parked, such that the processor causes the vehicle to perform the first vehicle action based on the determination that the vehicle is parked.

15. The system of claim 12, wherein the processor is further configured to execute the computer-executable instructions to:

detect a second predetermined gesture in a direction of a component of the vehicle, wherein the first predetermined gesture and second predetermined gesture are a same type of gesture, wherein the second predetermined gesture is performed in an opposite direction as the first predetermined gesture; and cause, based on the detection of the second predetermined motion, the vehicle to automatically perform a second vehicle action to control the component of the vehicle, wherein the second vehicle action is different than the first vehicle action.

16. A method, comprising:

detecting, via one or more sensors disposed within an interior cabin of a vehicle, motion exterior to the vehicle;

determining a predetermined motion based on the motion detected by the one or more sensors; and causing, based on the determination of the predetermined motioned, the vehicle to automatically perform a vehicle action.

17. The method of claim 16, further comprising detecting that a user device is within a predetermined distance from the vehicle, and detecting motion exterior of the vehicle based on detecting the user device.

18. The method of claim 16, further comprising determining that the vehicle is parked, and performing the vehicle action based on determining that the vehicle is parked.

19. The method of claim 16, further comprising locating, via the one or more sensors, one or more windows of the vehicle in 3D space, wherein motion exterior to the vehicle is detected through one or more windows or a windshield of the vehicle.

* * * * *